United States Patent [19]
Son et al.

[11] Patent Number: 5,644,561
[45] Date of Patent: Jul. 1, 1997

[54] METHOD OF DISCERNING DISC IN COMPACT DISC DRIVE

[75] Inventors: Woog-Ig Son, Suwon; Ki-Bong Yun, Anyang, both of Rep. of Korea

[73] Assignee: SamSung Electronics Co., Ltd., Suwon, Rep. of Korea

[21] Appl. No.: 628,938

[22] Filed: Apr. 8, 1996

[30] Foreign Application Priority Data

Apr. 7, 1995 [KR] Rep. of Korea ................... 8117/1995
Nov. 23, 1995 [KR] Rep. of Korea ................. 43204/1995

[51] Int. Cl.$^6$ ............................................. G11B 27/36
[52] U.S. Cl. ........................... 369/58; 369/50; 369/190; 369/239
[58] Field of Search ........................ 369/50, 53, 54, 369/58, 190, 267, 268, 44.26, 44.27, 239, 240; 360/73.03, 74.05

[56] References Cited

U.S. PATENT DOCUMENTS

| | | | |
|---|---|---|---|
| 3,966,330 | 6/1976 | Ridler et al. | 369/190 |
| 4,653,040 | 3/1987 | Senso | 369/239 |
| 4,773,052 | 9/1988 | Sugiura et al. | 369/190 |
| 4,797,869 | 1/1989 | Hirano | 369/184 |
| 5,042,025 | 8/1991 | Aoyagi et al. | 369/190 |
| 5,054,014 | 10/1991 | Ito et al. | 369/190 |
| 5,172,354 | 12/1992 | Otsubo | 369/44.27 |
| 5,508,987 | 4/1996 | Matsunaga et al. | 369/58 |

*Primary Examiner*—Thang V. Tran
*Attorney, Agent, or Firm*—Robert E. Bushnell, Esq.

[57] ABSTRACT

A method of discerning an optical disk in a compact disk drive which includes the steps of moving an optical pick-up device to a table of contents (TOC) region of an optical disk to perform a focusing operation for reading data from the optical disk, and discerning whether an optical disk is loaded on a turntable of the compact disk drive. When the optical disk is loaded in the compact disk drive, the loaded optical disk is rotatably driven by a spindle motor. The time necessary for the rotating speed of the optical disk to reach a predetermined speed is counted, and the counted time is then compared with a predetermined time to determine whether the optical disk is one of a first type having, for example, a eight centimeters diameter and a second type having, for example, a twelve centimeters diameter. If the counted time is less than the predetermined time, the loaded optical disk is determined as a eight centimeters disk. If, on the other hand, the counted time is not less than the predetermined time, i.e., the counted time is equal or greater than the predetermined time, the loaded optical disk is determined as a twelve centimeters disk. According to the present invention, the size of a loaded optical disk is determined based on the recognition that the time necessary for the loaded optical disk to reach a normal rotating speed will differ depending on the weight and thereby the size of the loaded optical disk. This method will considerably reduce the time delay between the loading operation and playing operations.

12 Claims, 4 Drawing Sheets

METHOD OF DISCERNING DISC IN COMPACT DISC DRIVE

CROSS-REFERENCE TO RELATED APPLICATION

This application makes reference to, incorporates the same herein, and claims all benefits accruing under 35 U.S.C. §119 from applications for *Method Of Discerning Disc In Compact Disc Drive* earlier filed in the Korean Industrial Property Office on 9 Apr. 1995 and 23 Nov. 1995 and there duly assigned Ser. No. 8117/1995 and 43204/1995, respectively.

BACKGROUND OF THE INVENTION

1. Technical Field

The present invention relates to a method of identifying characteristics of an optical disk in a compact disk drive such as a compact disk read-only-memory (CD-ROM) drive, and more particularly, to a method and apparatus for efficiently determining a size of optical disk loaded in a compact disk drive in order to timely prepare subsequent operations of a compact disk drive.

2. Background Art

Generally, an optical disk player such as a CD-ROM disk player and a compact disk player requires a mechanism that automatically loads an optical disk for recording and reproducing information to and from the optical disk. Within the optical disk player, the initial playing position of an optical pick-up device relative to the optical disk will differ depending upon the type of the optical disk used. Consequently, it is necessary to first determine the type of the optical disk inserted into the optical disk player before a servo gain of a spindle motor and its driver is adjusted as is disclosed, for example, in U.S. Pat. No. 5,054,014 for *Optical Disk Recording/Reproducing Apparatus And Rotary Drive Therefor* issued to Ito et al., in order to perform the recording and reproduction operations. Usually, the optical disks for use in a compatible optical disk player such as a CD-ROM drive come in various diameter sizes, for example, eight centimeters and twelve centimeters. Thus, it is necessary to determine whether the optical disk inserted into the optical disk player is one of a eight centimeters disk or a twelve centimeters disk in order to proceed with the recording and reproduction operations.

Conventionally, there are a number of known techniques for determining the size of the loaded optical disk. For example, a first technique such as disclosed, for example, in U.S. Pat. No. 5,042,025 for *Rotation Control System For Disk Player* issued to Aoyagi et al., involves the use of photosensors arranged at a predetermined position in an optical disk player. The diameter of a loaded optical disk is determined in accordance with the presence or absence of light reflected by the optical disk. In another technique, mechanical contacts such as a carrier as is disclosed in U.S. Pat. No. 4,797,867 for *Disk Detecting Apparatus* issued to Hirano, are arranged at a predetermined position in an optical disk player from which the type of optical disk is determined in accordance with several successive position of the carrier. These techniques however require additional circuitry and sensors, thereby increasing the production cost.

In U.S. Pat. No. 4,653,040 for *Disk Size Detecting Circuit* issued to Senso, the type of disk is determined according to the angle through which a spindle motor rotates until the speed of the spindle motor reaches a predetermined value. For example, in Senso '040, a rotational speed detecting circuit employs a rotational speed pulse generator, a frequency-to-voltage converter and a comparator, is used to generate a speed signal indicating a rotational speed of the spindle motor. A frequency detecting circuit having a counter, a frequency-to-voltage converter and a comparator, is additionally used to produce an angle signal indicating an angle through which the spindle motor has rotated. The angle signal is then compared with a reference value at a transition of the speed signal when the rotational speed of the spindle motor exceeds a predetermined rotational speed in order to discriminate the size of the optical disk loaded in the optical disk player. While the disk size detecting circuit of Senso '040 has its own merit, it is my observation that the circuit requires high production cost.

Alternatively, U.S. Pat. No. 5,172,354 for *Compatible Disk Player For Playing Multi-Size Disks And Having A Mode For Selecting One Disk Type* issued to Otsubo, notes a disk size determining technique in which an optical pick-up device is required to move to two different playing positions to determine whether a loaded optical disk is one of a compact disk and a video disk of different diameter sizes. If such a disk size determining technique is implemented into a CD-ROM drive system however, I have discovered that the optical pick-up device must first move to predetermined locations of respective optical disks of eight centimeters and twelve centimeters, and then move to a read-in area of each optical disk where a table of contents (TOC) is recorded in order to record or reproduce information data to and from the optical disk. I have also found that this required step, consumes valuable time in the preparation of the recording and reproduction of information data to and from an optical disk.

SUMMARY OF THE INVENTION

Accordingly, it is therefore an object of the present invention to provide an improved apparatus and method for identifying characteristics of optical disks.

It is another object to provide a method and apparatus for discerning the type of optical disk loaded in a compact disk drive in which the time delay between the loading operation and playing operations is minimized.

It is yet another object to provide a method and apparatus for determining the type of optical disk loaded in a compact disk drive based upon a determination of the time necessary for a spindle motor to reach to a predetermined speed.

It is also an object to provide a method and apparatus for determining the size of an optical disk loaded in a compact disk drive based on either software or simple hardware.

These and other objects of the present invention may be achieved with a method and apparatus for identifying characteristics of an optical disk in a compact disk drive constructed for moving an optical pick-up device to a table of contents (TOC) region of an optical disk to perform a focusing operation for reading data from the optical disk, and determining whether an optical disk is loaded on a turntable of the compact disk drive. When the optical disk is loaded in the compact disk drive, the loaded optical disk is rotatably driven by a spindle motor. The time necessary for the rotating speed of the optical disk to reach a predetermined speed is counted, and the counted time is then compared with a predetermined time to determine whether the optical disk is one of a first type having, for example, a eight centimeters diameter and a second type having, for example, a twelve centimeters diameter. If the counted time is less than the predetermined time, the loaded optical disk is determined as a eight centimeters disk. If, on the other hand, the counted time is not less than the predetermined time, i.e., the counted time is equal or greater than the predetermined time, the loaded optical disk is determined as a twelve centimeters disk. According to the present invention, the size of a loaded optical disk is determined based on the recognition that the time necessary for the loaded optical disk to reach a normal rotating speed will differ depending on the weight and thereby the size of the loaded optical disk. This practice of the invention will considerably reduce the time delay between the loading operation and playing operations.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
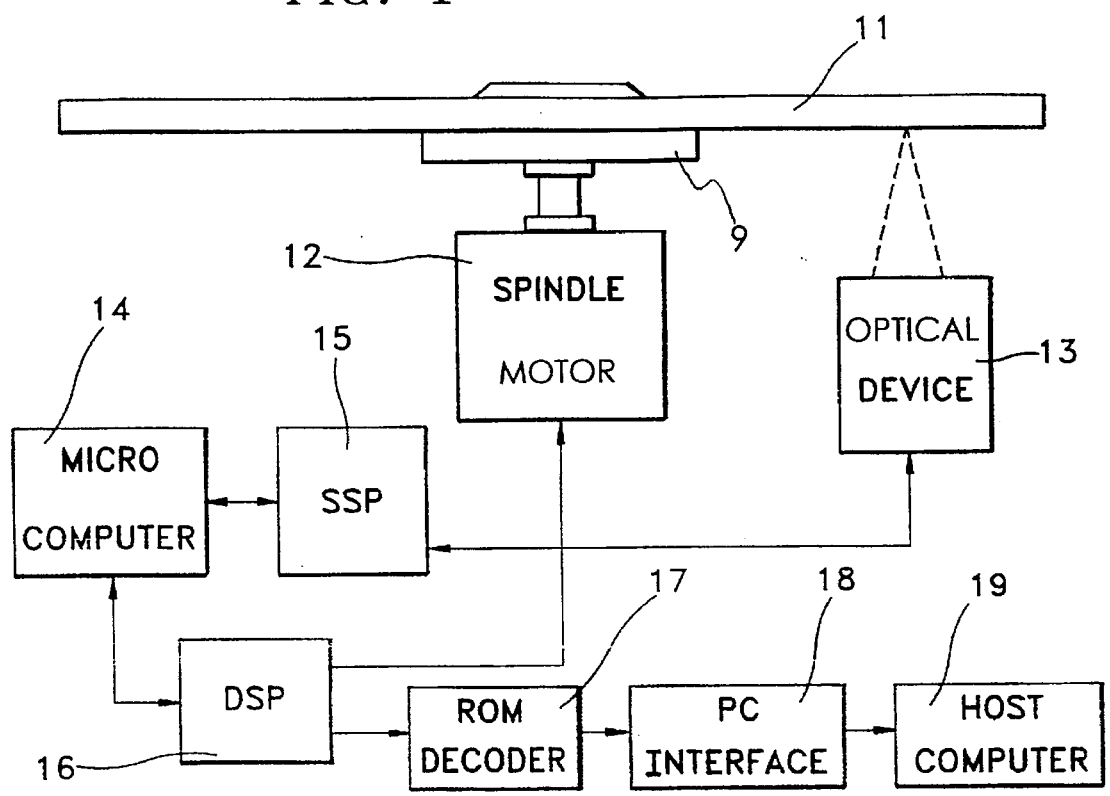
FIG. 1 is a schematic view illustrating a typical CD-ROM drive system.

Referring now to the drawings, FIG. 1 illustrates a typical CD-ROM drive system. The typical CD-ROM drive system 10 includes a spindle motor 12 for rotating an optical disk 11, an optical pick-up device 13 installed in the vicinity of the spindle motor 12 for reproducing the information recorded on the optical disk 11, a microcomputer 14 for controlling the entire drive system, a digital signal processor (DSP) 16 for controlling the spindle motor 12, a servo signal processor (SSP) 15 for receiving a predetermined signal from the optical pick-up device 13 and transmitting the received signal to the microcomputer 14, and a ROM decoder 17 for transmitting the information received from the DSP 16 to a separate host computer 19 through a PC interface 18.

Figure 2:
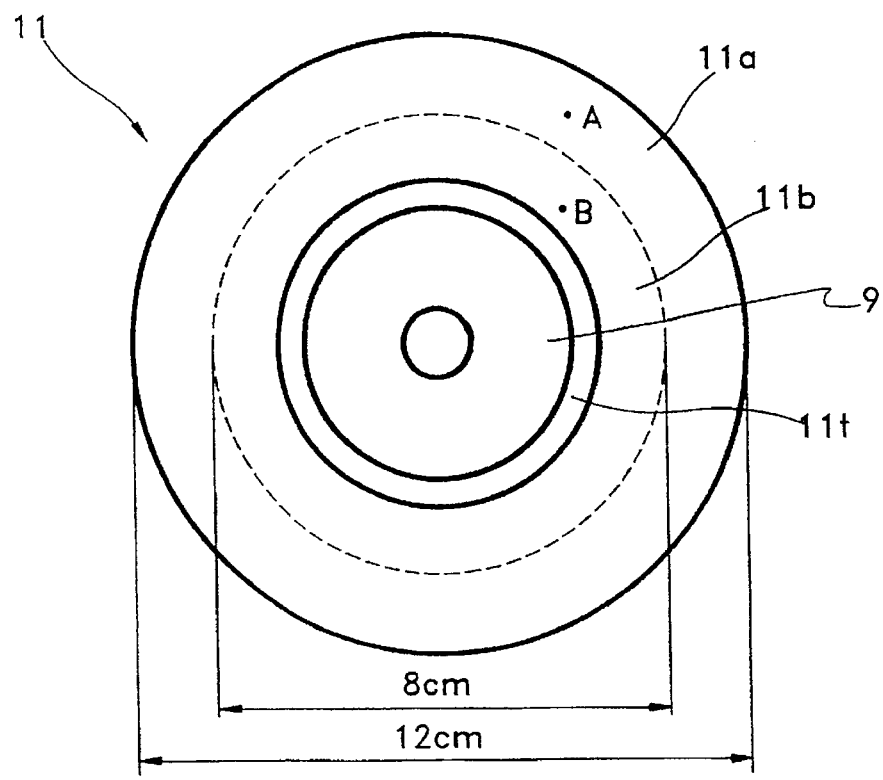
FIG. 2 is a plan view illustrating a typical optical disk having either a eight centimeters diameter or a twelve centimeters diameter as loaded in a CD-ROM drive system.

FIG. 2 is a plan view illustrating a typical optical disk having either a twelve centimeters diameter 11a or a eight centimeters diameter 11b as loaded on a turntable 9 of a CD-ROM drive system. Both optical disks 11a, 11b are constructed with a read-in area 11t where a table of contents (TOC) is recorded, and information area where information data is recorded. The TOC region contains information on the contents such as the number of information data recorded on the optical disk, address for each start, pause, end and the alike for each piece of data information.

Figure 3:
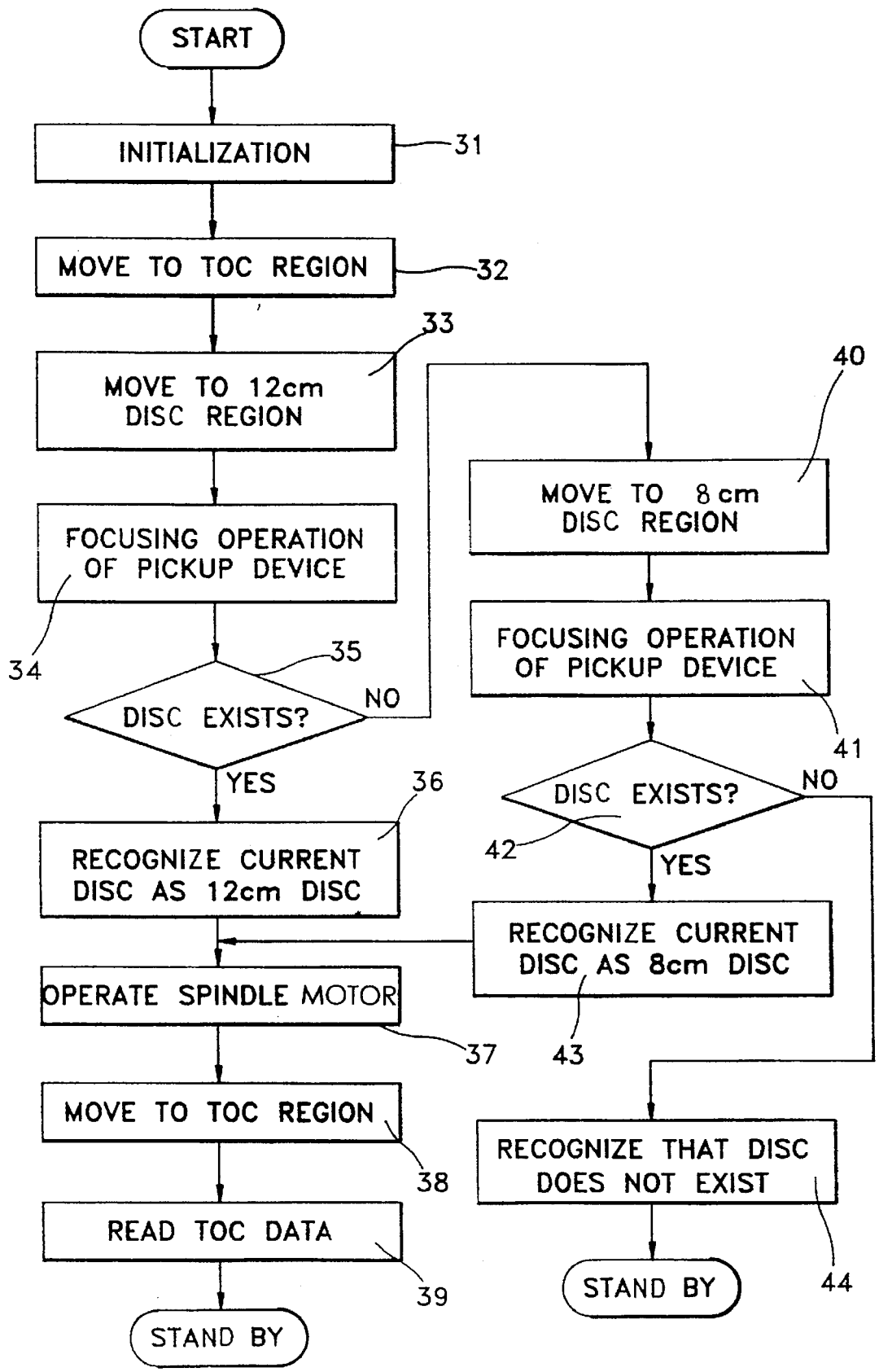
FIG. 3 is a flow chart explaining a disk size discerning method in the typical CD-ROM drive system.

FIG. 3 illustrates a conventional disk discerning method in the typical CD-ROM drive system. Referring to FIGS. 1 to 3, a mechanism of discerning the optical disk in the typical CD-ROM drive system is briefly explained as follows.

Referring to FIG. 3, when power is supplied to the CD-ROM drive system so that each circuit device in the CD-ROM drive system operates to initialize the system at step 31, the optical pickup device 13 moves to a table of contents (TOC) region 11t of the optical disk loaded in the CD-ROM drive system at step 32. Once the optical pick-up device 13 moves to the TOC region 11t of a loaded optical disk, the optical pick-up device 13 then moves to a predetermined location "A" where an optical disk of twelve centimeters diameter 11a can be discerned at step 33. Thereafter, the pickup device 13 performs a focusing operation, while a head (not shown) installed in the optical pick-up device 13 moves up and down with respect to the surface of the optical disk 11a, to form a focus on the surface of the optical disk 11a at step 34, in order to determine whether an optical disk 11a exists at step 35.

After the optical pick-up device 13 is positioned over the predetermined location "A" where a loaded optical disk of twelve centimeters diameter 11a can be discerned, and the loaded optical disk 11 is found at the predetermined location "A", the microcomputer 14 recognizes that the current loaded optical disk 11 is a twelve centimeters optical disk 11a through the SSP 15 at step 36, and concomitantly transmits a spindle motor driving signal to the DSP 16. The DSP 16 then controls the spindle motor 12 to start the rotation at step 37. At the same time, the optical pickup device 13 moves again to the TOC region 11t on the surface of the optical disk 11a to perform the focusing operation for reading the data at step 38. If the rotating speed of the optical disk 11a reaches a normal rotation speed where the data can be read, the optical pickup device 13 reads the data in the TOC region 11t of the surface of the optical disk 11a at step 39. Then the CD-ROM returns to a standby state for a next operation.

If, on the other hand, the loaded optical disk 11 is not found at the predetermined location "A", the microcomputer 14 controls the optical pick-up device 13 recognizes that the loaded optical disk 11 is not a twelve centimeters optical disk at step 35, the microcomputer 14 controls the optical pick-up device 13 to move to a second predetermined location "B" where an optical disk of eight centimeters diameter 11b can be discerned at step 40. Once the optical pick-up device 13 is positioned over the predetermined location "B" where an optical disk of eight centimeters diameter 11b can be discerned at step 41, the optical pick-up device 13 begins to perform the focusing operation for determining the existence of the eight centimeters optical disk 11b at step 42. If the loaded optical disk 11 is found at the predetermined location "B", the microcomputer 14 recognizes that the current loaded optical disk is a eight centimeters optical disk 11a through the SSP 15 at step 43. When the microcomputer 14 recognizes the current loaded optical disk 11 as a eight centimeters optical disk 11a, the microcomputer 14 transmits a spindle motor driving signal to the DSP 16 as in the case where a loaded optical disk 11 is recognized as a twelve centimeters optical disk 11a in order to begin the rotation of the spindle motor 12 at step 37.

Again, after the loaded optical disk 11b is rotatably driven by the spindle motor 12, the optical pickup device 13 moves again to the TOC region 11t on the surface of the optical disk 11b to perform the focusing operation for reading the data at step 38. If the rotating speed of the optical disk 11a reaches a normal rotation speed where the data can be read, the optical pickup device 13 reads the data in the TOC region 11t of the surface of the optical disk 11a at step 39. Then the CD-ROM returns to a standby state for a next operation.

If the loaded optical disk 11 is not found at the predetermined location "B" however, the microcomputer 14 recognizes that no optical disk was loaded in the compact disk drive at step 44 and returns to a standby state for a next operation.

In such a typical CD-ROM drive system, however, I note that the optical pick-up device 13 must first move to two different predetermined locations of respective optical disks before a table of contents (TOC) region is accessed in order to record or reproduce information data to and from the optical disk. This required step, as I have observed, consumes valuable time in the preparation of the recording and reproduction of information data to and from an optical disk.

Figure 4:
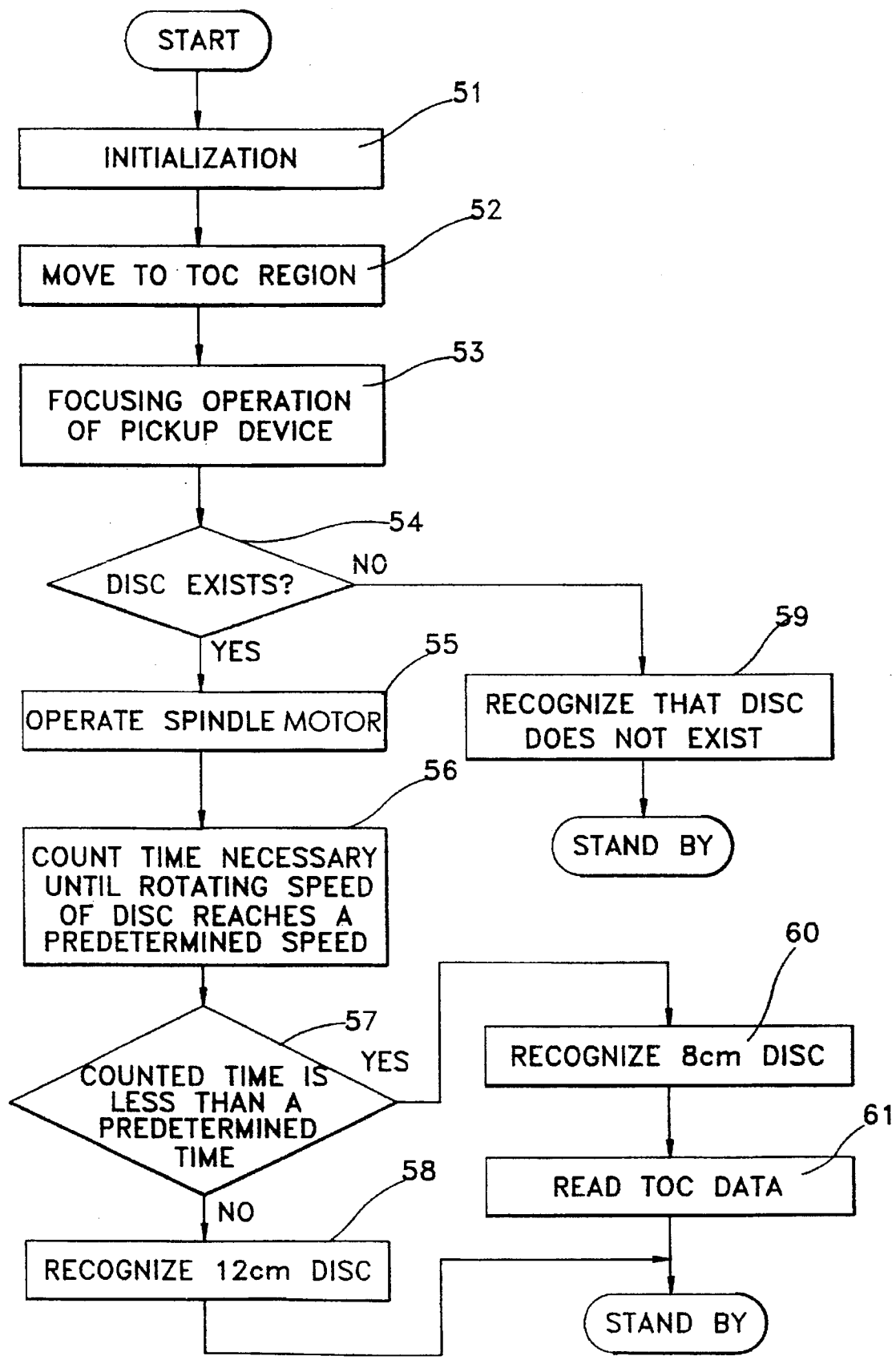
FIG. 4 is a flow chart explaining a method of discerning an optical disk size in a compact disk drive constructed according to the present invention.

Turning now to FIG. 4 which illustrates a method of discerning an optical disk size in a compact disk drive constructed according to the present invention with reference to FIG. 1. Referring to FIGS. 1, 2 and 4, when power is supplied to the CD-ROM drive system so that each circuit device in the CD-ROM drive system operates to initialize the system at step 51, the optical pickup device 13 moves to a table of contents (TOC) region 11t of an optical disk 11 loaded in the CD-ROM drive system at step 52. Once the optical pick-up device 13 is positioned over the TOC region 11t of an optical disk 11, the optical pick-up device 13 performs a focusing operation at step 53 in order to determine whether an optical disk 11 is presence on a turntable 9 of the compact disk drive at step 54. If the microcomputer 13 determines that them is no optical disk loaded on the turntable 9 of the CD-ROM drive system at step 54, the microcomputer 14 recognizes the absence of such an optical disk at step 59 and returns to a standby state. If, however, the microcomputer 13 determines that there is an optical disk 11 loaded on the turntable 9 of the CD-ROM drive system at step 54, the microcomputer 14 sets a counting coefficient of a timer (not shown) installed inside the CD-ROM drive system to "0" and issues a counting order to the timer. Also, the microcomputer 14 issues an order to the DSP 16 to operate the spindle motor 12. According to the order, the DSP 16 operates the spindle motor 12 to rotate the optical disk 11 at step 55. If the optical disk 11 begins to rotate as above, the optical pick-up device 13 reads data recorded on the rotating optical disk 11 and transmits the read data to the SSP 15. Then, the SSP 15 reads the data and transmits the data to the DSP 16. The DSP 16 controls the rotating speed of the spindle motor 12 according to the transmitted data. In other words, the rotating speed is increased to reach a normal rotation speed. If the rotating speed of the optical disk 11 roaches the normal speed, the DSP 16 transmits a predetermined signal indicating a normality of the rotating speed of the disc 11 to the microcomputer 14. Then, the microcomputer 14 reads the counted value of the timer at step 56, and determines whether the counted value is less than a predetermined reference time at step 57.

Figure 5:
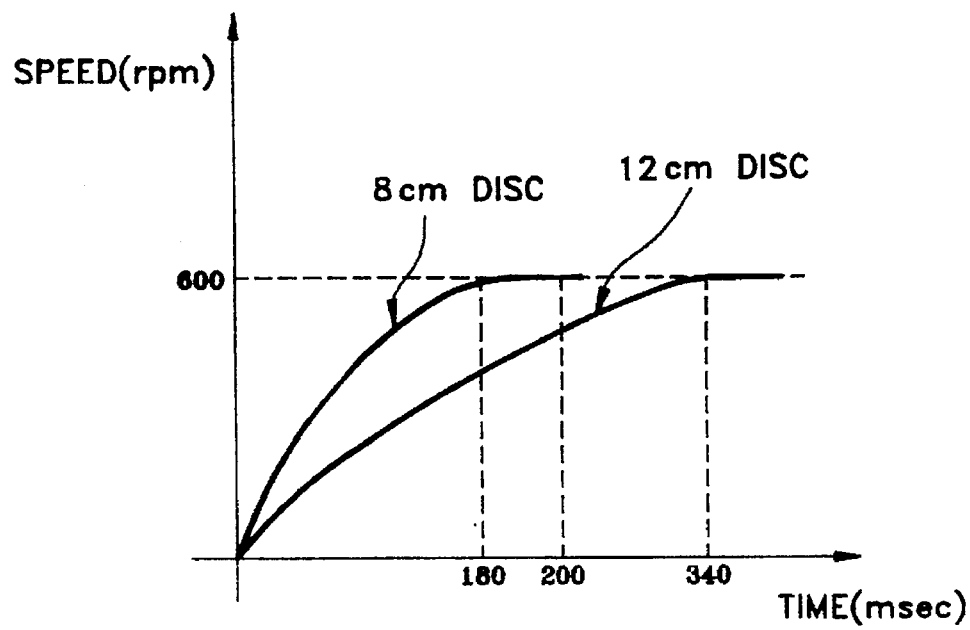
FIG. 5 is a graph showing the relation of a rotating speed with respect to time in the method of discerning an optical disk size in the compact disc drive constructed according to the principles of the present invention.

Referring now to FIGS. 4 and 5, the above process is explained in more detail as follows. In FIG. 4, if the spindle motor 12 operates to rotate the disk at step 55, the time necessary for the rotating speed of the spindle motor 13 to reach a predetermined normal speed is counted at step 56.

Once the time is counted, the counted time is compared with a predetermined reference time to determine whether the counted time is less than the predetermined reference time step 57.

For example, as shown in FIG. 5, which illustrates the relation of a rotating speed with respect to time in the method of discerning an optical disk size in the compact disk drive constructed according to the present invention. In case that a predetermined reference time and the normal rotating speed of the disc are set 200 msec and 600 rpm, respectively, it is discerned whether the rotating speed reaches the normal speed of 600 rpm within the reference time of 200 msec. At the discerning step 57, if an answer is yes, a relatively smaller optical disk, an eight centimeters disk, is recognized at step 60. If, on the other hand, the answer is no, a relatively larger optical disk, a twelve centimeters disk, is recognized at step 58.

As the result of a test that I conducted prior to the filing of the instant application in the Korean Industrial Property Office on 9 Apr. 1995 and 23 Nov. 1995 and there assigned Ser. No. 8117/1995 and 43204/1995, respectively, it was proved that the rotating speeds of the eight centimeters and twelve centimeters optical disks reach the normal speed of 600 rpm within 180 msec and 340 msec on the average, respectively. Since the time until the rotating speed of an optical disk loaded in the compact disk drive reaches the normal speed is set in the unit of msec, it takes an extremely short time to determine whether the diameter of the optical disk is eight centimeters or twelve centimeters.

Figure 6:
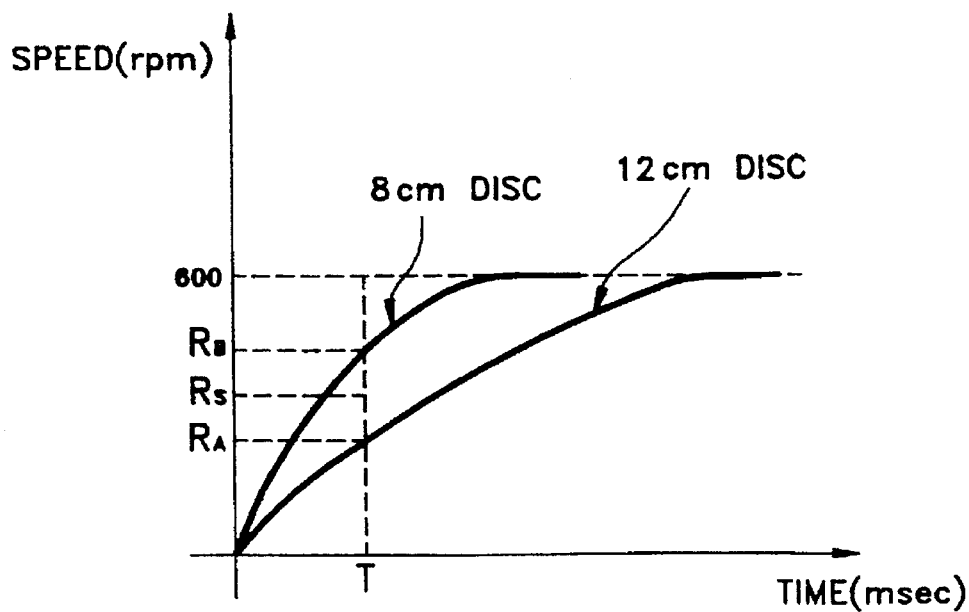
FIG. 6 is a graph showing the speed difference between an eight centimeters optical disk and a twelve centimeters optical disk at a point of time in the determination of the size of an optical disk size in the compact disk drive constructed according to the principles of the present invention.

Such a disk recognition is realized by the microcomputer 14 through the DSP 16 and a program for performing the above process is pre-memorized in the microcomputer 14 or an extra auxiliary storage for supporting the microcomputer 14. In addition, as shown in FIG. 6, the microcomputer 14 or the extra auxiliary storage store a program for detecting the rotating speeds $R_A$ and $R_B$ of the twelve centimeters and eight centimeters discs at a predetermined point of time T, respectively, and comparing those detected speeds with a predetermined reference speed $R_S$, in order to determine a loaded optical disk size by recognizing the current optical disk as a twelve centimeters disk if the detected rotating speed is less than the predetermined reference speed $R_S$ and recognizing the current optical disk as a eight centimeters disk if the detected rotating speed is greater than the predetermined reference speed $R_S$. Here, the flow chart for performing such a program can be obtained by slightly modifying that of FIG. 4.

Once the size of a loaded optical disk is determined, the optical pickup device 13 reads the data of the TOC region 11t on the surface of the optical disk at step 61 and then the microcomputer 14 sets the compact disk drive is in the standby state for a subsequent operation.

As explained above, since the method of determining the type of optical disk loaded in the compact disk drive constructed according to the present invention measures the rotating speed of an optical disk to determine the size of the optical disk, a disk size determining time is much shorter than that of the conventional method. Accordingly, it is possible to reduce considerably the necessary time to determine the type of a loaded optical disk, and the time delay between the loading operation and playing operations. Further, while software is preferably included in the microcomputer 14 for detecting the rotating speeds $R_A$ and $R_B$ of the twelve centimeters and eight centimeters optical disks and comparing those detected speeds with a predetermined reference speed $R_S$, in order to determine the size of a loaded optical disk size, a simple hardware construction may be implemented to determine the size of an optical disk loaded in the compact disk drive as part of the controller in lieu of the microcomputer used as shown in FIG. 1. For example, a disk size detecting circuit may be constructed with a rotational speed detector for detecting when and whether a rotating speed of a spindle motor reaches a predetermined speed, a counter for starting to count the time necessary for the rotating speed of the spindle motor to reach the predetermined speed upon the start of the operation of the spindle motor, and a comparator for comparing the counted time with a reference time in order to determine the size of an optical disk loaded in the compact disk drive.

While there have been illustrated and described what are considered to be preferred embodiments of the present invention, it will be understood by those skilled in the art that various changes and modifications may be made, and equivalents may be substituted for elements thereof without departing from the true scope of the present invention. For example, optical or magnetic disks of different sizes may be determined based on the steps contemplated by the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments failing within the scope of the appended claims.

What is claimed is:

1. A method of determining an optical disk size in a compact disk drive, comprising the steps of:

moving an optical pick-up device to a table of contents region of an optical disk to perform a focusing operation for reading data from said optical disk;

determining whether said optical disk is loaded in the compact disk drive;

rotating said optical disk when said optical disk is determined as loaded in the compact disk drive;

measuring the time for a rotating speed of said optical disk to reach a reference speed;

comparing the measured time with a reference time, when the rotating speed of said optical disk reaches the reference speed;

recognizing said optical disk loaded in the compact disk drive as a relatively small optical disk, when the measured time is less than the reference time; and alternatively, recognizing said optical disk loaded in the compact disk drive as a relatively large optical disk, when the measured time is not less than the reference time.

2. The method of claim 1, wherein said optical disk loaded in the compact disk drive corresponds to one of a twelve centimeters disk and a eight centimeters disk.

3. The method of claim 2, wherein said optical disk being recognized as the twelve centimeters disk when the measured time is not less than the reference time.

4. The method of claim 2, wherein said optical disk being recognized as the eight centimeters disk when the measured time is less than the reference time.

5. A method of determining the size of a recording medium loaded in an information receptacle, comprising the steps of:

moving an information pick-up device to a table of contents region of a recording medium to perform a focusing operation for reading data from said recording medium;

determining whether said recording medium is present in the information receptacle;

rotating said recording medium, when said recording medium is present in the information receptacle;

measuring a rotating speed of said recording medium after a predetermined time period;

comparing the measured rotating speed with a predetermined reference speed;

recognizing said recording medium as a relatively large recording medium, when the measured rotating speed is less than the predetermined reference speed; and alternatively, recognizing said recording medium as a relatively small recording medium, when the measured rotating speed is not less than the predetermined reference speed.

6. The method of claim 5, wherein said recording medium loaded in the information receptacle corresponds to one of a twelve centimeters optical disk and a eight centimeters optical disk.

7. The method of claim 6, wherein said recording medium being recognized as the twelve centimeters optical disk when the measured time is not less than the reference time.

8. The method of claim 6, wherein recording medium being recognized as the eight centimeters optical disk when the measured time is less than the reference time.

9. An optical disk size detecting apparatus for determining the size of an optical disk loaded in a disk player, comprising:

a spindle motor for rotating an optical disk;

an optical pick-up device arranged to move along a radial line of said optical disk, when said optical disk is loaded in the disk player, to a predetermined position of said an optical disk to read information data stored on said optical disk loaded in the disk player; and control means for controlling movement of the optical pick-up device, the rotation of the spindle motor, and for determining the size of said optical disk loaded in the disk player by:

determining first whether said optical disk is loaded in the disk player;

rotating said optical disk when said optical disk is determined as loaded in the disk player;

measuring the time for a rotating speed of said optical disk to reach a reference speed;

comparing the measured time with a reference time, when the rotating speed of said optical disk reaches the reference speed;

recognizing said optical disk loaded in the compact disk drive as a relatively small optical disk, when the measured time is less than the reference time; and alternatively, recognizing said optical disk loaded in the compact disk drive as a relatively large optical disk, when the measured time is not less than the reference time.

10. The optical disk size detecting apparatus of claim 9, wherein said optical disk loaded in the disk player corresponds to one of a twelve centimeters disk and a eight centimeters disk.

11. The optical disk size detecting apparatus of claim 10, wherein said optical disk being recognized as the twelve centimeters disk when the measured time is not less than the reference time.

12. The optical disk size detecting apparatus of claim 11, wherein said optical disk being recognized as the eight centimeters disk when the measured time is less than the reference time.

* * * * *